(12) United States Patent
Tian

(10) Patent No.: US 12,392,405 B2
(45) Date of Patent: Aug. 19, 2025

(54) GEARBOX AND TRANSMISSION SYSTEM

(71) Applicant: Guangzhou Sunqee Gear Co., Ltd., Guangdong (CN)

(72) Inventor: Shunjun Tian, Guangdong (CN)

(73) Assignee: Guangzhou Sunqee Gear Co., Ltd., Guangzhou (CN)

( * ) Notice: Subject to any disclaimer, the term of this patent is extended or adjusted under 35 U.S.C. 154(b) by 0 days.

(21) Appl. No.: 18/613,184

(22) Filed: Mar. 22, 2024

(65) Prior Publication Data

US 2025/0215967 A1  Jul. 3, 2025

(30) Foreign Application Priority Data

Dec. 29, 2023 (CN) .......................... 202311861960.2

(51) Int. Cl.
*F16H 57/023* (2012.01)
*F16H 57/08* (2006.01)

(52) U.S. Cl.
CPC ......... *F16H 57/023* (2013.01); *F16H 57/082* (2013.01); *F16H 2057/085* (2013.01)

(58) Field of Classification Search
CPC . F16H 1/30; F16H 1/225; F16H 52/22; F16H 57/023; F16H 57/082
See application file for complete search history.

(56) References Cited

U.S. PATENT DOCUMENTS

| | | | | |
|---|---|---|---|---|
| 5,570,606 A | * | 11/1996 | Irie | F16H 1/203 74/606 R |
| 8,672,284 B2 | * | 3/2014 | Klinke | F16H 25/20 248/405 |
| 2006/0213302 A1 | * | 9/2006 | Hoffmann | B29C 65/16 74/425 |
| 2010/0206111 A1 | * | 8/2010 | Keller | H02K 7/081 74/412 R |
| 2020/0031321 A1 | * | 1/2020 | Joon-Kyu | F16H 1/30 |
| 2022/0307291 A1 | * | 9/2022 | Chang | F16H 35/10 |

FOREIGN PATENT DOCUMENTS

CN  107269768 B  6/2023

* cited by examiner

*Primary Examiner* — Ernesto A Suarez
*Assistant Examiner* — Lillian T Nguyen

(57) ABSTRACT

A gearbox includes a box, a first gear, and a second gear, in which the box is provided with a hollow chamber; the first gear is connected with a first rotating shaft and includes a first and second gear segment; the second gear is connected with a second rotating shaft and rotates around an axial direction thereof; and the first and second gear are provided in the chamber, the worm shaft is engaged perpendicular to the first gear segment so that the axial direction of the first rotating shaft is perpendicular to an axial direction of rotation of the worm shaft, the second gear segment is engaged perpendicular to the second gear so that the axial direction of the second rotating shaft is perpendicular to the axial direction of the first rotating shaft, and both ends of the first and second rotating shaft are all mounted in the box.

17 Claims, 11 Drawing Sheets

GEARBOX AND TRANSMISSION SYSTEM

CROSS-REFERENCE TO RELATED APPLICATIONS

The present application claims priority of Chinese Patent Application No. 202311861960.2 filed on Dec. 29, 2023 before CNIPA. All the above are hereby incorporated by reference in their entirety.

FIELD

The present disclosure relates to the technical field of speed-reduction transmission and, particularly, a gearbox and a transmission system.

BACKGROUND

With the development of intelligent furniture, an increasing number of pieces of furniture are required to be equipped with automatic retractable rods, such as lifting tables, lifting parasols and lifting windows. Some furniture requiring load bearing is generally designed with a worm shaft transmission, not only as it offers the advantage of higher transmission ratios and higher power transmission, but also as the worm shaft offers a certain degree of self-locking capability. However, the worm shaft actuator is too large to be integrated within some retractable legs of furniture with a limited cross-sectional area. Therefore, it is necessary to adjust the fitting relationship of the gears within the gearbox so that the motor, the worm shaft, and the gearbox are integrated within the legs of the furniture with a limited cross-sectional area when the motor drives the worm shaft to rotate in a coaxial manner.

Disclosed in the prior art is a reduction transmission device (Chinese Patent application No. 107269768B). The patent discloses the utilization of floating clearance to allow gear engagement to automatically be centered, which is not applicable in an output stage transmission that bears heavy loads. The device may be applied to first-stage transmissions with light loads and products that do not pose a safety hazard on failure, e.g., motorized toys, water meter timers, etc. However, when used in a non-first-stage transmission, or even in a transmission system at the output end, there may be significant pitfalls. Also, the above patent also discloses a disk-shaped shaft holder provided in a housing, an upper end of a long mandrel is fixed below a front cover of a motor, and a lower end thereof is fixed to a disk-shaped shaft holder. Based on its floating clearance fit, if it is applied in a heavy-loaded situation, for example, a linear brake-type lifting table in motorized furniture, more than just placing items on the lifting table, the lifting table must also cope with the user's hands to press against the table, or even the user's sitting on the table, which may lead to disengagement of gears, presenting a significant safety hazard. Most of the torque requirement standard for gearbox output stage on the market is 4 NM-120 RPM. In the rated load test under this standard, the structure described in the above patent is likely to suffer from self-locking failure, which may lead to accidents such as hitting a child under the table. Therefore, the patented product is not suitable for the application and mass production of linear brake-type in motorized furniture.

SUMMARY

In order to overcome at least one of deficiencies in the prior art mentioned above, provided in the present disclosure is a gearbox and a transmission system, which may solve the problems of the prior art that the output torque and stability fail to meet the use requirements in the case of coaxial transmission of the motor, worm shaft and output shaft.

The technical solutions adopted by the present disclosure to solve the problems are as follows.

A gearbox, including:
a box, provided with a hollow chamber;
a worm shaft;
a first gear, connected with a first rotating shaft, comprising a first gear segment and a second gear segment, rotated around an axial direction of the first rotating shaft;
a second gear, connected with a second rotating shaft, rotated around an axial direction of the second rotating shaft; and
an output shaft, in transmission connection with the second gear,
wherein the worm shaft, the first gear, and the second gear are provided in the chamber, the output shaft extends out of the chamber, the worm shaft is engaged perpendicular to the first gear segment so that the axial direction of the first rotating shaft is perpendicular to an axial direction of rotation of the worm shaft, the second gear segment is engaged perpendicular to the second gear so that the axial direction of the second rotating shaft is perpendicular to the axial direction of the first rotating shaft, and both ends of the first rotating shaft and both ends of the second rotating shaft are all mounted in the box.

By adopting the solution mentioned above, both ends of both the first rotating shaft and the second rotating shaft are all mounted in the box. The box, as a main component of the gearbox, has a relatively high structural strength. During the load work of the gearbox, as the both ends of the first rotating shaft and the second rotating shaft are all mounted in the box, so that the first rotating shaft and the second rotating shaft are stably fixed, effectively avoiding the technical problem of the rotating shaft being suspended or floating in the prior art, which ensures that the first gear and the second gear are in a stable engagement state, so as to enable the gearbox to be applied in the application scenarios that require a high level of output torque. Additionally, the second gear may be connected to the corresponding output shaft, such as an output shaft, a planetary transmission structure or a first-stage gear ring, depending on the use requirements, which may ensure the advantages of high output torque and good safety performance on the basis of high operational stability of the entire gearbox.

Further, the box includes a first housing and a second housing, the first housing being connected to the second housing to form the chamber;
the first housing is provided with a first mounting hole and a second mounting hole, both ends of the first rotating shaft being mounted in the first mounting hole and the second mounting hole respectively; and
the first housing is provided with a third mounting hole, the second housing is provided with a fourth mounting hole, and both ends of the second rotating shaft are mounted in the third mounting hole and the fourth mounting hole respectively.

By adopting the solution mentioned above, the box is divided into a first housing and a second housing to facilitate the installation of the components inside the box. Both ends of the first rotating shaft are mounted in the first mounting holes and the second mounting holes, so as to ensure the working stability of the first gear; and both ends of the second rotating shaft are mounted in the third mounting holes and the fourth mounting holes, so as to ensure the working stability of the second gear.

Further, the second gear includes a third gear segment and a fourth gear segment, the third gear segment is engaged with the second gear segment, the fourth gear segment is engaged in parallel to the third gear, the third gear is connected with a third rotating shaft, the third gear is rotated around an axial direction of the third rotating shaft, the axial direction of the third rotating shaft is co-linear with the axial direction of the worm shaft, and the third gear is in transmission connection with the output shaft by means of a planetary transmission mechanism.

By adopting the solution mentioned above, the third gear segment and the fourth gear segment of the second gear engage the worm shaft and the third gear, respectively. The worm shaft and the third gear are coaxially transmitted, which allows for easy external connection of a retractable structure to achieve the retractable function. More importantly, it allows the motor, the worm shaft, and the third gear to be adjusted for coaxial movement, which achieves that the motor, the worm shaft, and the gearbox are provided in a space or chamber with a limited cross-sectional area. The third gear may be connected to a corresponding output shaft, such as an output shaft, a planetary transmission structure, or a first-stage gear ring, and finally to a retractable rod to accomplish the retracting action.

Further, the third gear includes a fifth gear segment and a sixth gear segment, the fifth gear segment is engaged in parallel to the fourth gear segment, the box is provided with a first avoidance hole, the sixth gear segment passes through the first avoidance hole to connect a first-stage planetary transmission mechanism of the planetary transmission mechanism, the sixth gear segment serves as a sun gear of the first-stage planetary transmission mechanism, and an output end of the first-stage planetary transmission mechanism is in transmission connection with the output shaft.

By adopting the solution mentioned above, the sixth gear segment of the second gear cooperates with the first-stage planetary transmission mechanism to provide a greater torque transmission capacity in a relatively small space, and the structure of the first-stage planetary transmission mechanism is simple and stable, with less friction between components and a long service life of the transmission.

Further, an end of the box proximal to the sixth gear segment is extended with a recess towards an axial direction of the sixth gear segment, an interior wall of the recess is provided with internal gear teeth constituting a first-stage gear ring of the first-stage planetary transmission mechanism, at least one first-stage planetary gear is provided between the sixth gear segment and the recess, all first-stage planetary gears are engaged with the sixth gear segment and the first-stage gear ring respectively, and the first-stage planetary gear is in transmission connection with the output shaft.

By adopting the solution mentioned above, utilizing the stability of the connection between the second housing and the first housing, a recess is provided, and internal gear teeth are provided in the recess to be served as a first-stage gear ring of the first-stage planetary transmission mechanism to ensure the stability of the first-stage planetary transmission mechanism for coping with applications under high load conditions.

Further, the chamber is provided with a structural plate fixed on the box, the structural plate is provided with a fifth mounting hole and a second avoidance hole, the fourth gear segment passes through the second avoidance hole to engage with the fifth gear segment, the first-stage planetary gear is connected with a fourth rotating shaft, the fourth rotating shaft is connected with an output planetary carrier, the output planetary carrier is provided with a sixth mounting hole, both ends of the third rotating shaft are mounted in the fifth mounting hole and the sixth mounting hole respectively, a second-stage planetary transmission mechanism of the planetary transmission mechanism is provided between the output planetary carrier and the first-stage planetary transmission mechanism, and the output planetary carrier serves as the output shaft.

By adopting the solution mentioned above, the setup of the fifth mounting hole and the sixth mounting hole ensures the strength of the third rotating shaft, which ensures the stability of the third gear during transmission to cope with the application scenario of high loads. The output is carried out through the fourth rotating shaft of the first planetary gear of the first planetary transmission mechanism, which provides excellent load-sharing performance, and the number of the first planetary gears as well as the modulus of the entire first planetary transmission mechanism may be adjusted depending on the level of the output torque to meet the high torque output under different torque requirements.

Further, a columnar segment is provided at a connection between the fifth gear segment and the sixth gear segment of the third gear, the first avoidance hole is provided with a bearing, and the columnar segment is abutted against an interior wall of the bearing.

By adopting the solution mentioned above, the columnar segment of the third gear is abutted against the interior wall of the bearing, and the exterior wall of the bearing is abutted against the first avoidance hole, so as to distribute the load of the middle of the third gear to the structural plate through the bearing during rotation of the third gear, so as to improve the stability of the third gear during movement to cope with the working scenario of high loads.

Further, there is a plurality of first gears and correspondingly a plurality of first rotating shafts, all the first gears and the first rotating shafts are arranged evenly spaced apart in a peripheral direction of the worm shaft, the first housing is provided with the first mounting holes and the second mounting holes at positions corresponding to both ends of each first rotating shaft, and both ends of each first rotating shaft are fixedly mounted in correspondingly the first mounting hole and the second mounting hole respectively; and there is a plurality of second gears and correspondingly a plurality of second rotating shafts, each second gear is engaged with the corresponding first gear, the first housing is provided with the third mounting holes at positions corresponding to an end of each second rotating shaft, the second housing is provided with the fourth mounting holes at positions corresponding to an opposite end of each second rotating shaft, and both ends of each second rotating shaft are fixedly mounted in correspondingly the third mounting hole and the fourth mounting hole respectively.

By adopting the solution mentioned above, a plurality of first gears and second gears are provided to bear the load evenly, improving the stability of the gearbox and avoiding the occurrence of accidents caused by the loss of self-locking force due to gear fatigue resulting from disengagement from the motor power in the case of working at high frequency or high loads.

Further, an interior wall of the first housing facing the second housing is provided with an annular flange, a side of the second housing facing the first housing is provided with an annular protrusion corresponding to the annular flange, and the annular flange is snap-fitted with the annular protrusion.

By adopting the solution mentioned above, it facilitates the assembly of the first housing and the second housing, and also allows the structural plate to be snap-fitted to further improve the integrality and stability of the gearbox, thereby reducing the occurrence of offsetting of the structural plate due to excessive loading. The annular flange and the annular protrusion are provided on the first housing and the second housing respectively. When mounting the first housing and the second housing, the structural plate may be fixed, which facilitates mounting, and the annular flange and the annular protrusion provide better fixation to the structural plate, thereby improving the stability of the gearbox.

Provided in the present disclosure is also a transmission system, including a motor and the gearbox mentioned above, a motor output shaft is coaxially in transmission connection with the worm shaft, and the output shaft of the gearbox is coaxially in transmission connection with the motor output shaft and the worm shaft.

By adopting the solution mentioned above, the output shaft, the motor, and the worm shaft of the gearbox are transmitted coaxially, which facilitates the mounting of the entire transmission system in a space or chamber with a limited cross-sectional area and may be applied in application scenarios requiring high output torque, effectively solving the safety hazards present in the prior art.

In summary, the gearbox and the transmission system provided in the present disclosure provides technical effects as follows.

Both ends of the first rotating shaft and both ends of the second rotating shaft are all mounted in the box. The box, as the main component of the gearbox, with a relatively high structural strength and stability, ensures the first gear and the second gear are in a stable engagement state during the load work, so as to enable the gearbox to be applied in the application scenarios that require a high level of output torque.

The meanings of the attached markings are as follows: 1 box; 11 first housing; 111 first mounting space; 112 third mounting hole; 113 first mounting hole; 114 second mounting hole; 115 annular flange; 12 second housing; 121 second mounting space; 122 fourth mounting hole; 123 first avoidance hole; 124 bearing; 125 recess; 126 internal gear teeth; 127 annular protrusion; 2 worm shaft; 3 first gear; 31 first gear segment; 32 second gear segment; 33 first rotating shaft; 4 second gear; 41 third gear segment; 42 fourth gear segment; 43 second rotating shaft; 5 third gear; 51 fifth gear segment; 52 sixth gear segment; 53 columnar segment; 54 third rotating shaft; 61 first-stage planetary gear; 62 fourth rotating shaft; 7 structural plate; 71 fifth mounting hole; 72 second avoidance hole; 8 output planetary carrier; 81 sixth mounting hole; 91 second-stage sun gear planetary carrier; 911 second-stage sun gear; 912 output rotating plate; 913 through-hole; 92 second-stage planetary gear; 921 fifth rotating shaft; 100 motor; 101 motor output shaft.

DETAILED DESCRIPTION OF THE EMBODIMENTS

For a better understanding and implementation, the technical solutions in the embodiments of the present disclosure are clearly and completely described and discussed below in conjunction with the attached drawings of the present disclosure. Obviously, the embodiments described herein are only some of the embodiments of the present disclosure but not all of them. Based on the embodiments in the present disclosure, all other embodiments acquired by those skilled in the art without inventive effort fall within the scope of protection of the present disclosure.

In order to facilitate the understanding of the embodiments of the present disclosure, specific embodiments in conjunction with the attached drawings are further explained hereinafter, and each embodiment does not constitute a limitation to the embodiments of the present disclosure.

In the description of the present disclosure, it is to be noted that the terms "up", "down", "front", "back", "left", "right", "vertical", "horizontal", "top", "bottom", "inside", "outside" and other orientation or position relationships are based on the orientation or position relationships shown in the attached drawings. It is only intended to facilitate description of the present disclosure and simplify description, but not to indicate or imply that the referred device or element has a specific orientation, or is constructed and operated in a specific orientation. Therefore, they should not be construed as a limitation of the present disclosure.

Unless otherwise defined, all terms including technical and scientific terms used herein have the same meaning as commonly understood by those skilled in the art to which the present disclosure belongs. The terms used herein in the specification of the present disclosure are used only to describe specific embodiments and are not intended as a limitation of the disclosure.

Embodiment 1

Figure 1:
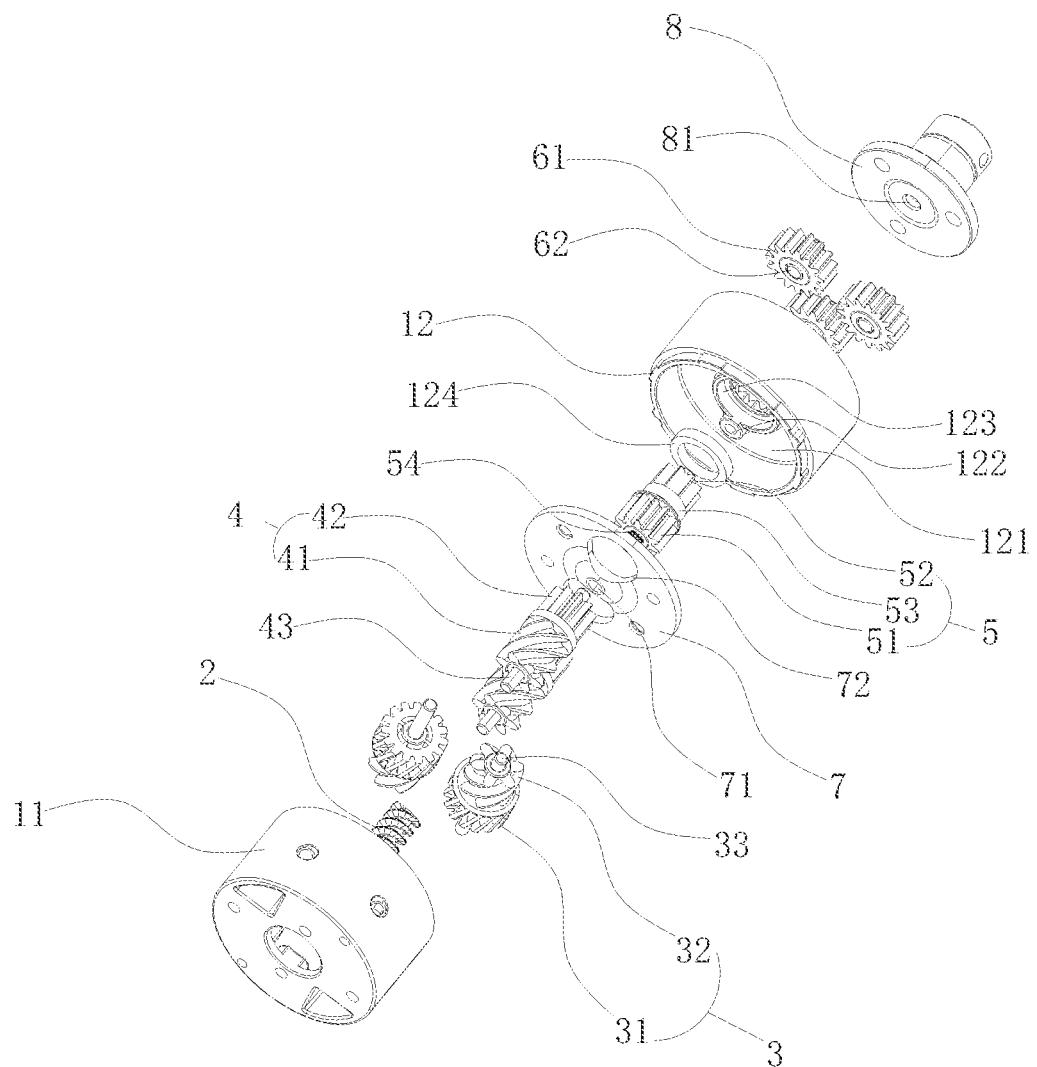
FIG. 1 is a structural diagram in an exploded view of the gearbox of embodiment 1 of the present disclosure.
Figure 2:
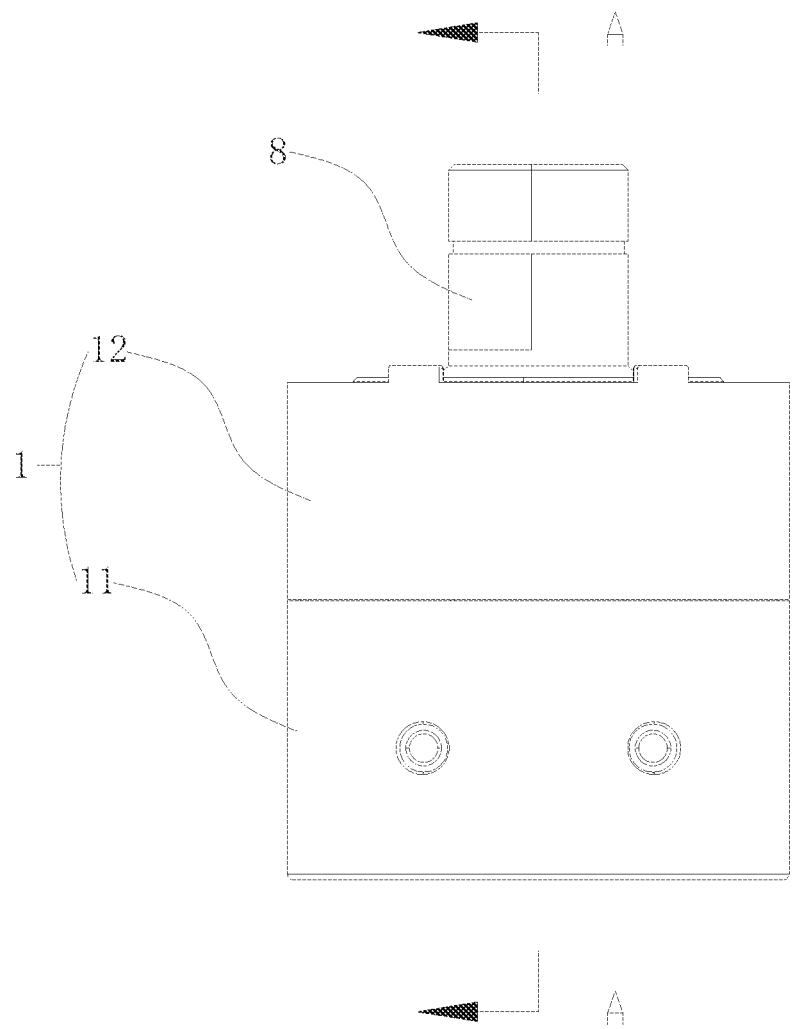
FIG. 2 is a side view of the gearbox of embodiment 1 of the present disclosure.

Disclosed in the present disclosure is a gearbox, referring to FIG. 1 and FIG. 2, the gearbox includes a box 1, a worm shaft 2, a first gear 3, and a second gear 4, in which the box 1 is provided with a hollow chamber, and the worm shaft 2, the first gear 3 and the second gear 4 are all provided in the chamber. The first gear 3 is connected with a first rotating shaft 33, including a first gear segment 31 and a second gear segment 32, rotated around an axial direction of the first rotating shaft 33. The second gear 4 is connected with a second rotating shaft 43, rotated around an axial direction of the second rotating shaft 43. The worm shaft 2 is engaged perpendicular to the first gear segment 31 so that the axial direction of the first rotating shaft 33 is perpendicular to an axial direction of rotation of the worm shaft 2, the second gear segment 32 is engaged perpendicular to the second gear 4 so that the axial direction of the second rotating shaft 43 is perpendicular to the axial direction of the first rotating shaft 33, and both ends of the first rotating shaft 33 and both ends of the second rotating shaft 43 are all mounted in the box 1.

Figure 3:
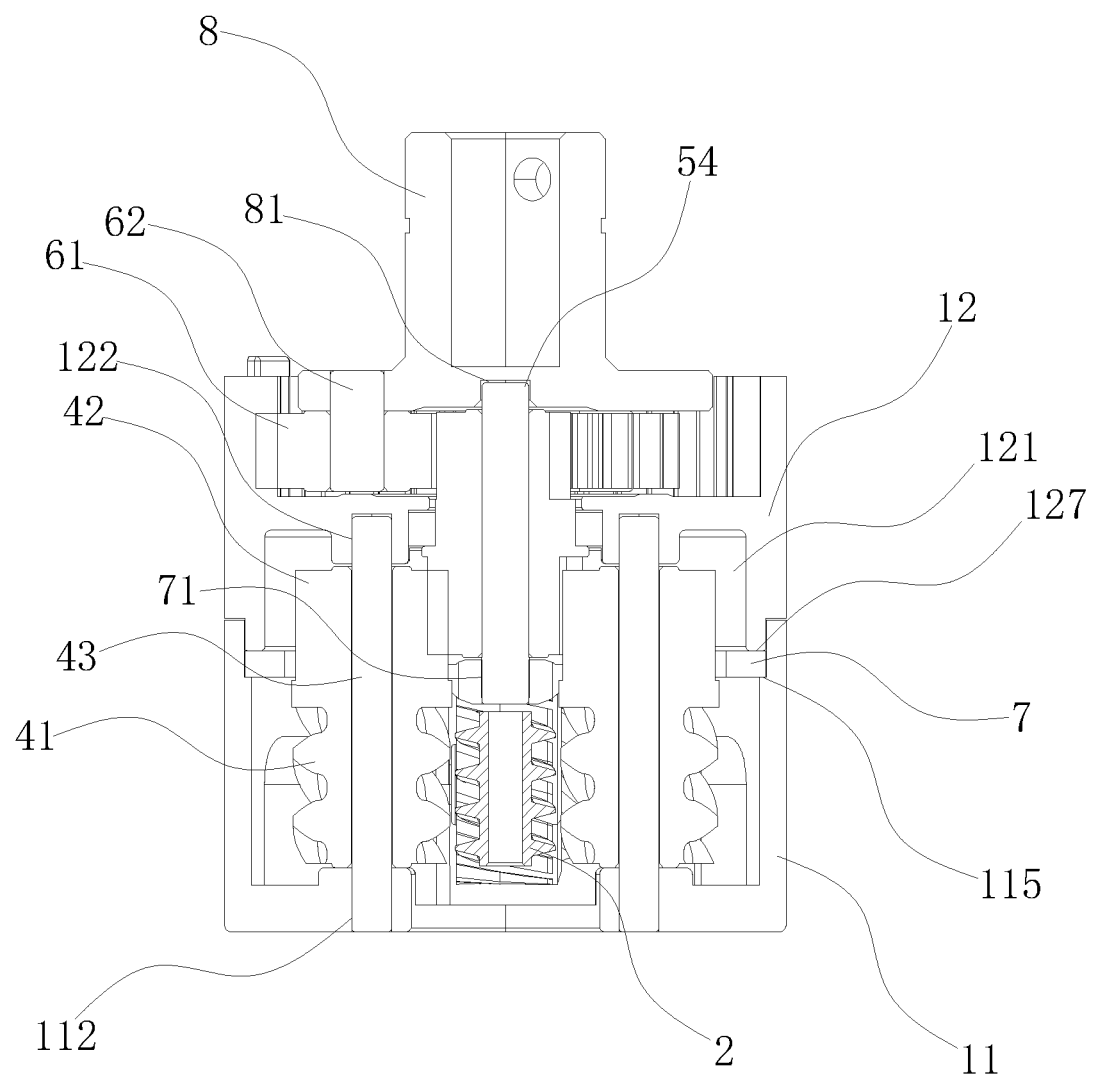
FIG. 3 is a structural diagram in an A-A sectional view of FIG. 2 of embodiment 1 of the present disclosure.

Specifically, referring to FIG. 1 and FIG. 3, the box 1 contains a hollow chamber. The first gear segment 31 is provided with helical teeth. The worm shaft 2 is engaged in perpendicular to the first gear segment 31, changing the transmission direction to the axial direction of the first rotating shaft 33 perpendicular to the axial direction of rotation of the worm shaft 2. The worm shaft 2 and the first gear segment 31 are vertically fitted to provide the gearbox with a certain degree of self-locking function. The first gear segment 31 and the second gear segment 32 are rotated synchronously, in which the engagement positions between the second gear segment 32 and the second gear 4 are all helical teeth. The second gear segment 32 is engaged in perpendicular to the second gear 4, changing the transmission direction from a direction in parallel to the axial direction of the first rotating shaft 33 to a vertical direction in parallel to the axial direction of the second rotating shaft 43. Since the second gear segment 32 and the second gear 4 are vertically fitted, the self-locking function of the gearbox may be further improved, the load bearing capacity may be improved, and the gear fatigue in the gearbox due to the great load or frequent movement of the application scenarios leading to accidents due to the failure of self-locking may be avoided eventually.

In the present embodiment, since both ends of the first rotating shaft 33 and both ends of the second rotating shaft 43 are all mounted in the box 1. The box 1, as a main component of the gearbox, with a relatively high structural strength and stability, still ensures that the first gear 3 and the second gear 4 are kept in a balanced and stable engagement state during a heavy load work, so as to enable the gearbox of the present embodiment to be applied in the application scenarios that require a high level of output torque. Additionally, when both ends of the first rotating shaft 33 and both ends of the second rotating shaft 43 are all fixedly mounted on some components fixedly mounted in the box 1, it also achieves the effect of the present disclosure, which allows the first rotating shaft 33 and the second rotating shaft 43 not to be suspended or inclined or swayed under load, ensuring the first gear 3 and the second gear 4 to be kept in a balanced and stable engagement state.

In the present embodiment, the second gear 4 may be connected to the corresponding output shaft, such as a planetary transmission structure or a gear ring, depending on the use requirements, which may ensure the advantages of high output torque and good safety performance on the basis of relatively high operational stability of the entire gearbox. More importantly, when the output shaft, planetary transmission structure or gear ring connected to the second gear 4 is transmitted coaxially with the worm shaft 2, it allows the gearbox to be provided in a relatively small space or chamber, and it ensures that the gearbox offers a high output stability and safety performance. Admittedly, when the chamber space of the gearbox is relatively large, and/or, when the output torque requirement of the gearbox is relatively low, and/or, when the safety performance of the gearbox is not highly required, the style, connection position and connection method of the output shaft to which the second gear 4 is connected may be freely selected according to the convenience of the design or production of the applied product.

Figure 5:
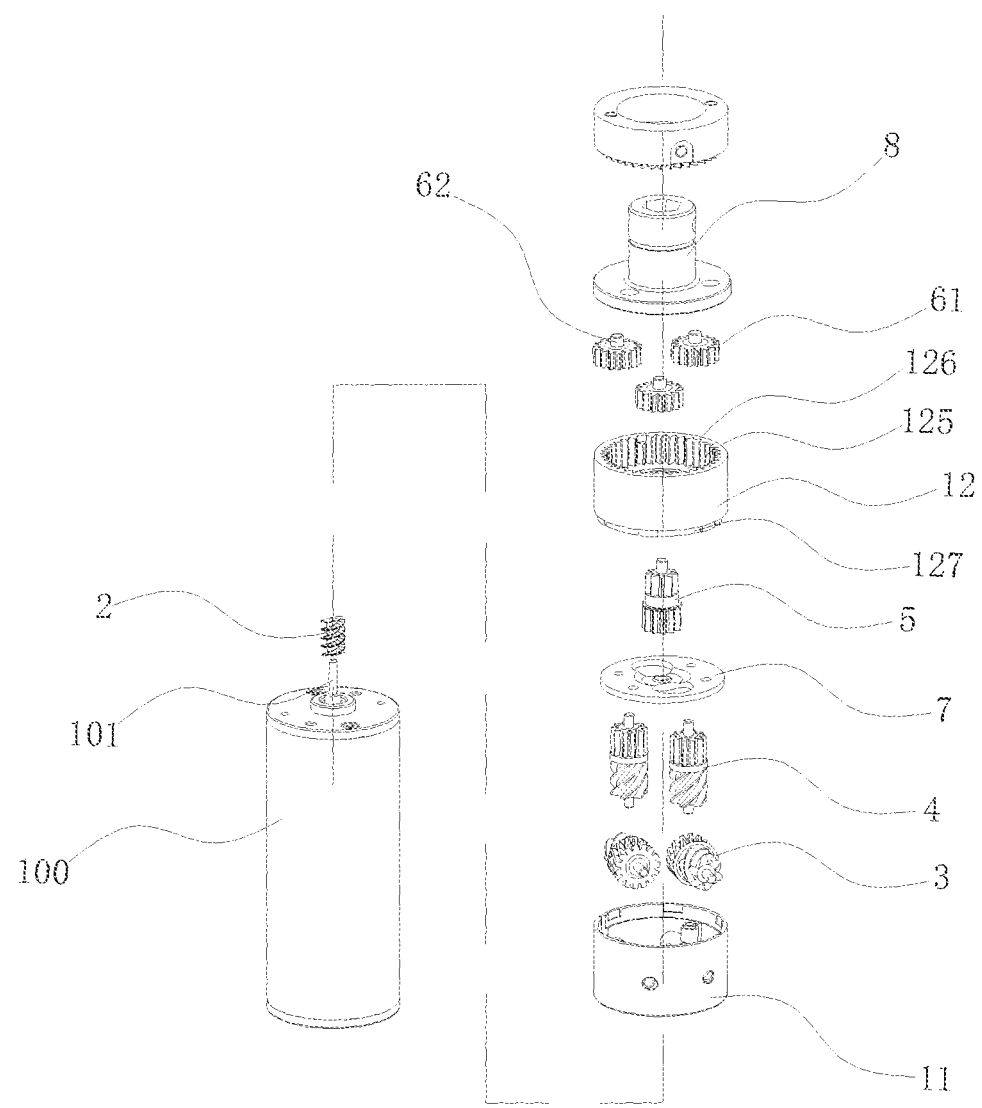
FIG. 5 is a structural diagram in an exploded view of the gearbox and the motor provided coaxially of embodiment 1 of the present disclosure.

The specific transmission process of the above structure is: referring to FIG. 5, the worm shaft 2 is first coaxially in transmission connection with the motor output shaft 101 of the motor 100, in which the worm shaft 2 and the motor output shaft 101 of the motor 100 are in transmission connection when the worm shaft 2 and the motor output shaft 101 of the motor 100 are of separate design; and the worm shaft 2 is inserted into the chamber of the box 1 to be engaged with the first gear segment 31 in perpendicular transmission connection when the worm shaft 2 and the motor output shaft 101 of the motor 100 are of integral molded structure. The above setup ensures that the axial direction of the worm shaft 2 is co-linear with the axial direction of the motor 100, so that the gearbox and the motor 100 may be integrated into a limited space or chamber, e.g., the space of table legs. The worm shaft 2 is rotated and drives the first gear segment 31 and the second gear segment 32 of the first gear 3 to rotate synchronously, the second gear segment 32 of the first gear 3 drives the second gear 4 to rotate, and then the second gear 4 is connected to the output shaft for power output.

It should be noted that the first gear segment 31 and the second gear segment 32 of the first gear 3 in the present disclosure may be an integrally molded gear, or they may be two separate gears capable of synchronous rotation formed by two separate gears having the first gear segment 31 and the second gear segment 32 respectively, which are connected by the first rotating shaft 33. Both ends of the first rotating shaft 33 and both ends of the second rotating shaft 43 may be fixedly mounted in the box 1, i.e., the first gear 3 and the second gear 4 are rotated while the first rotating shaft 33 and the second rotating shaft 43 are not rotated. Alternatively, bearings 124 may be provided at the mounting positions of the first rotating shaft 33 and the second rotating shaft 43 within the box 1, in which both ends of the first rotating shaft 33 and both ends of the second rotating shaft 43 are inserted into preset corresponding bearings 124 respectively. That is, the first rotating shaft 33 and the second rotating shaft 43 within the bearings 124 are rotated synchronously with the rotation of the first gear 3 and the second gear 4 when the first gear 3 and the second gear 4 are rotated.

In order to facilitate the installation of the various components inside the box 1, the box 1 includes a first housing 11 and a second housing 12, the first housing 11 and the second housing 12 are connected to constitute a chamber, the first housing 11 is provided with a third mounting hole 112, the second housing 12 is provided with a fourth mounting hole 122, both ends of the second rotating shaft 43 are mounted in the third mounting hole 112 and the fourth mounting hole 122 respectively, the first housing 11 is provided with a first mounting hole 113 and the second mounting hole 114, and both ends of the first rotating shaft 33 are mounted in the first mounting hole 113 and the second mounting hole 114.

Figure 4:
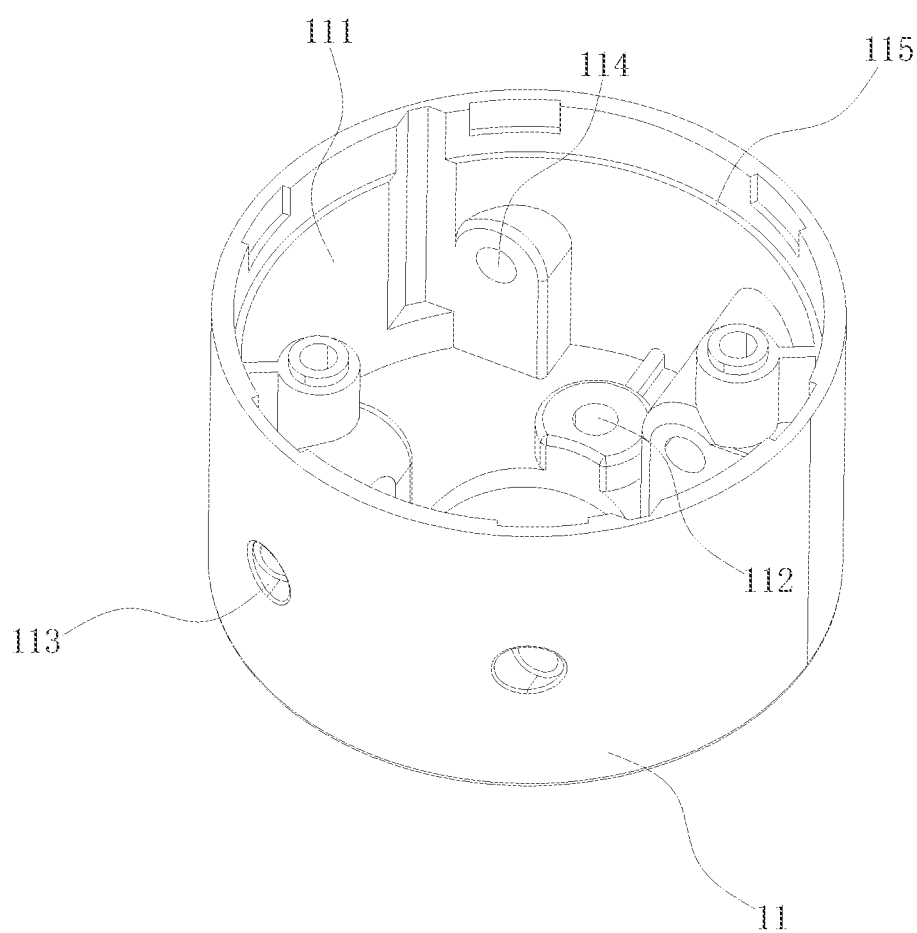
FIG. 4 is a structural diagram of the first housing of embodiment 1 of the present disclosure.

Specifically, referring to FIG. 1, FIG. 3, and FIG. 4, the first housing 11 is provided with a first mounting space 111, the second housing 12 is provided with a second mounting space 121, the first housing 11 and the second housing 12 constitutes a hollow chamber by means of the first mounting space 111 and the second mounting space 121 being snap-fitted with each other. For facilitating the mounting between the first housing 11 and the second housing 12, a connection structure, such as a spline, may be provided at a connection between the first housing 11 and the second housing 12 to facilitate the initial mounting and fixing of the first housing 11 and the second housing 12, which facilitates the production and subsequent installation of the gearbox itself. Both ends of the first rotating shaft 33 are fixedly mounted in the first mounting hole 113 and the second mounting hole 114 respectively, which ensures that the first rotating shaft 33 does not suffer from disengagement when subjected to a large load, thereby ensuring the stability of the first gear 3 when in operation. Both ends of the second rotating shaft 43 are fixedly mounted in the third mounting hole 112 and the fourth mounting hole 122, which ensures that the second rotating shaft 43 does not suffer from disengagement when subjected to a large load, thereby ensuring the stability of the second gear 4 when in operation.

In order to ensure the output stability and structural compactness of the gearbox, referring to FIG. 1, the second gear 4 includes a third gear segment 41 and a fourth gear segment 42, the third gear segment 41 is engaged with the second gear segment 32, the fourth gear segment 42 is engaged in parallel to the third gear 5, the third gear 5 is connected with a third rotating shaft 54, the third gear 5 is rotated around an axial direction of the third rotating shaft 54, and the axial direction of the third rotating shaft 54 is co-linear with the axial direction of the worm shaft 2. The third gear 5 is in transmission connection with the output shaft by means of a planetary transmission mechanism so as to increase the transmission ratio and to allow for a smoother and more precise output of the gearbox. The planetary transmission mechanism may be first-stage or multi-stage, and the number of stages of the planetary transmission mechanism may be increased or decreased according to the actual application scenarios.

Specifically, referring to FIG. 1, the third gear segment 41 and the fourth gear segment 42 are provided on the second gear 4, in which the third gear segment is provided with helical teeth for changing the transmission direction between the first gear 3 and the second gear 4. The fourth gear segment 42 may be configured as spur teeth or helical teeth, which ensures that the second gear 4 and the third gear 5 are engaged in parallel transmission. The axial directions of both the third gear 5 and the third rotating shaft 54 are co-linear with the axial direction of the worm shaft to achieve the coaxial transmission of the worm shaft 2 and the third gear 5. Then, the third gear 5 is externally connected to a retractable structure, which allows for a retractable effect. More importantly, the motor 100, the worm shaft 2, and the third gear 5 may be adjusted for coaxial movement, thereby achieving that the motor 100, the worm shaft 2, and the gearbox are provided in a space or chamber with a limited cross-sectional area. Additionally, when the gearbox is required to cope with relatively high loads, the third gear 5 may be connected to a corresponding output shaft, such as a planetary output carrier or a gear ring, to increase the load capacity of the gearbox. Finally, the output shaft of the gearbox is connected to a retractable rod to accomplish the retracting action.

It should be noted that the third gear segment 41 and the fourth gear segment 42 of the third gear 4 in the present disclosure may be an integrally molded gear, or they may be two separate gears capable of synchronous rotation formed by two separate gears having the third gear segment 41 and the fourth gear segment 42 respectively, which are connected by the second rotating shaft 43.

In some implementations, referring to FIG. 1, in order to improve the stability and output torque of the gearbox, on the basis of the structure mentioned above, the third gear 5 includes a fifth gear segment 51 and a sixth gear segment 52, the fifth gear segment 51 is engaged in parallel to the fourth gear segment 42, the box 1 is provided with a first avoidance hole 123 at the second housing 12, the sixth gear segment 52 passes through the first avoidance hole 123 to connect a first-stage planetary transmission mechanism, and the sixth gear segment 52 serves as a first-stage sun gear of the first-stage planetary transmission mechanism.

Specifically, referring to FIG. 1, the third gear 5 is divided into two gear segments, i.e., the fifth gear segment 51 and the sixth gear segment 52, which facilitates setting the modulus of the fifth gear segment 51 and the sixth gear segment 52 for facilitating engagement of the fifth gear segment 51 with the fourth gear segment 42, and the sixth gear segment 52 serving as the first-stage sun gear is engaged with the first-stage planetary transmission mechanism. The first-stage planetary transmission mechanism provides excellent stability while increasing the torque resistance of the gearbox output shaft. The sixth gear segment 52 of the second gear 4 cooperates with the first-stage planetary transmission mechanism to provide a greater torque transmission capacity in a relatively small space, allowing the gearbox to be designed into retractable legs of furniture with a limited cross-sectional area, and the structure of the first-stage planetary transmission mechanism is simple and stable, with less friction between the components, low noise, and a long service life.

It should be noted that the fifth gear segment 51 and the sixth gear segment 52 of the third gear 5 in the present disclosure may be an integrally molded gear, or they may be two separate gears capable of synchronous rotation formed by two separate gears having the fifth gear segment 51 and the sixth gear segment 52 respectively, which are connected by the third rotating shaft 54.

Referring to FIG. 5, an end of the second housing 12 proximal to the sixth gear segment 52 is extended with a recess 125 towards an axial direction of the sixth gear segment 52, an interior wall of the recess 125 is provided with internal gear teeth 126, the recess 125 and the internal gear teeth 126 constitutes a first-stage gear ring of the first-stage planetary transmission mechanism collectively, at least one first-stage planetary gear 61 is provided between the sixth gear segment 52 and the recess 125, all first-stage planetary gears 61 are engaged with the sixth gear segment 52 and the internal gear teeth 126. The above structure utilizes the stability of the connection between the second housing 12 and the first housing 11. For example, a recess 125 is provided, and internal gear teeth 126 are provided in the recess 125 to be served as a first-stage gear ring of the first-stage planetary transmission mechanism to ensure the stability of the first-stage planetary transmission mechanism for coping with applications under high load conditions. Admittedly, a separate design of the first-stage gear ring and the second housing 12 may also be adopted for use when the requirements for ease of assembly, stability and precision of the gearbox are relatively low.

Figure 7:
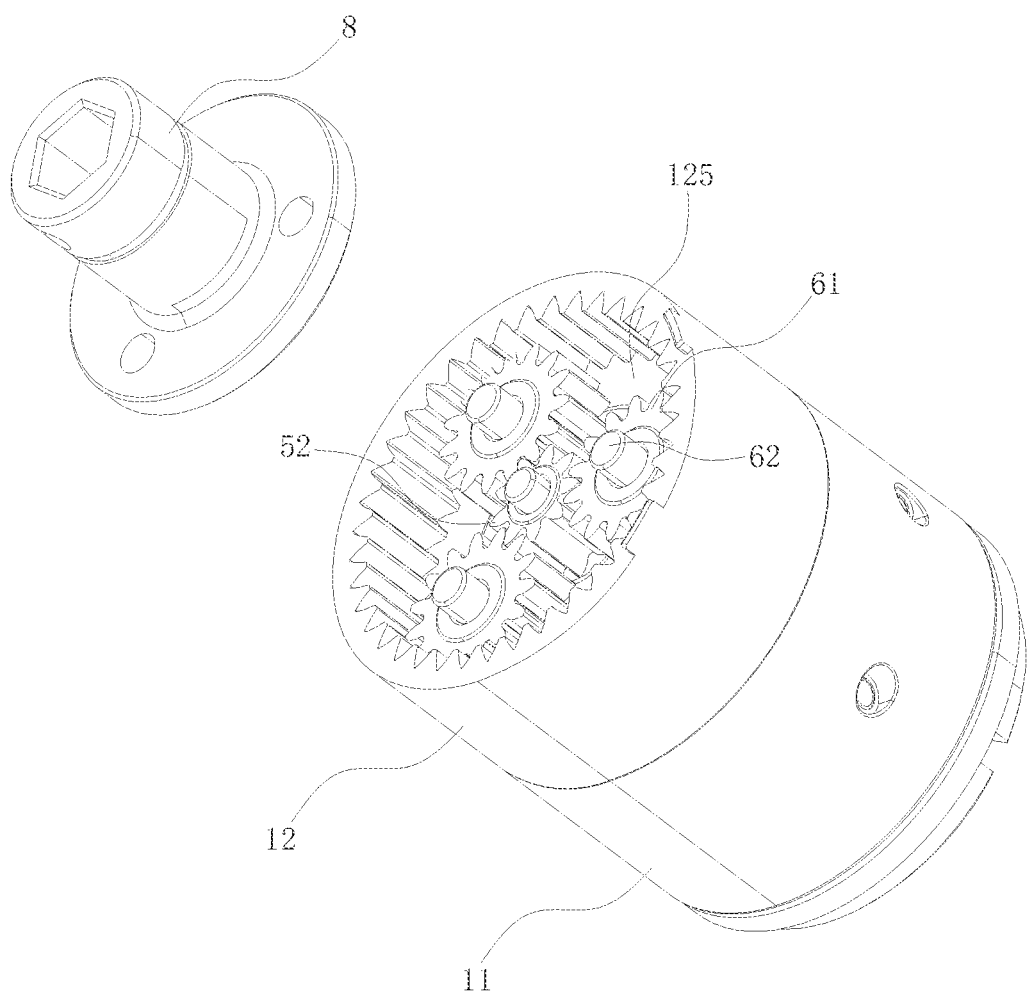
FIG. 7 is an exploded diagram of an output part of the gearbox of embodiment 1 of the present disclosure.
Figure 8:
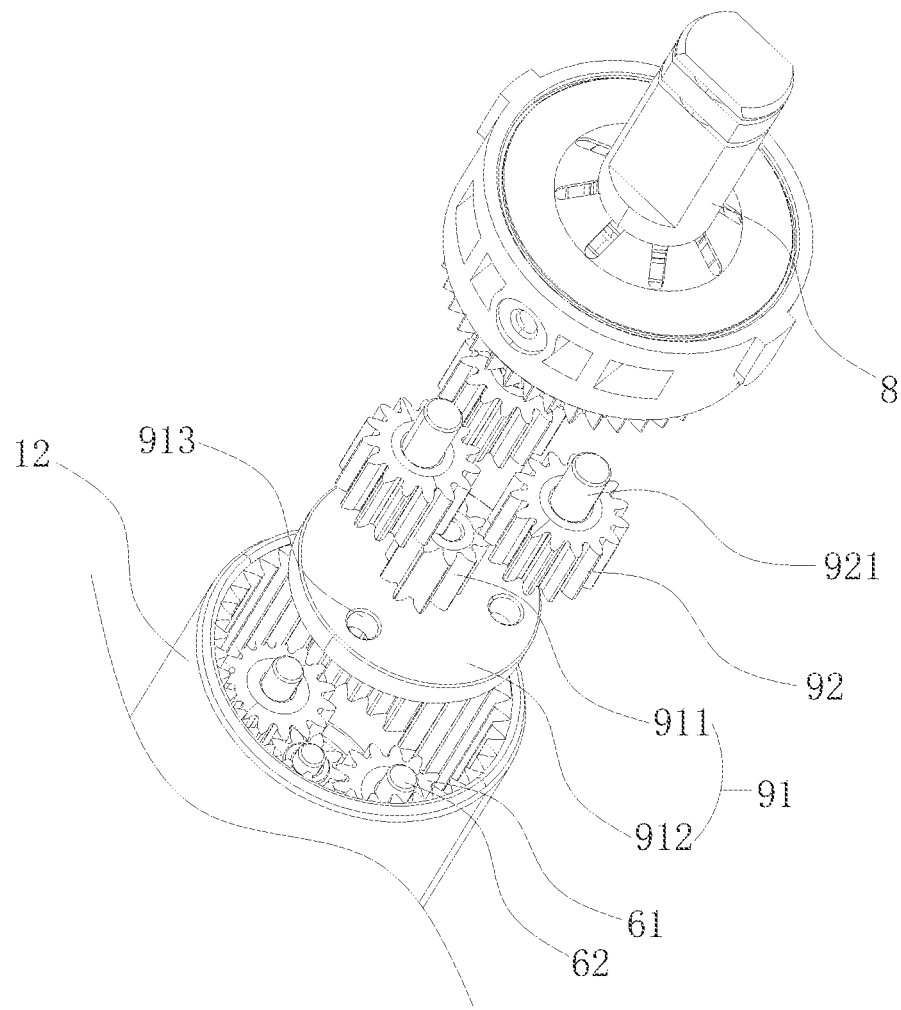
FIG. 8 is a structural diagram in an exploded view of the second-stage planetary transmission mechanism of embodiment 2 of the present disclosure.
Figure 9:
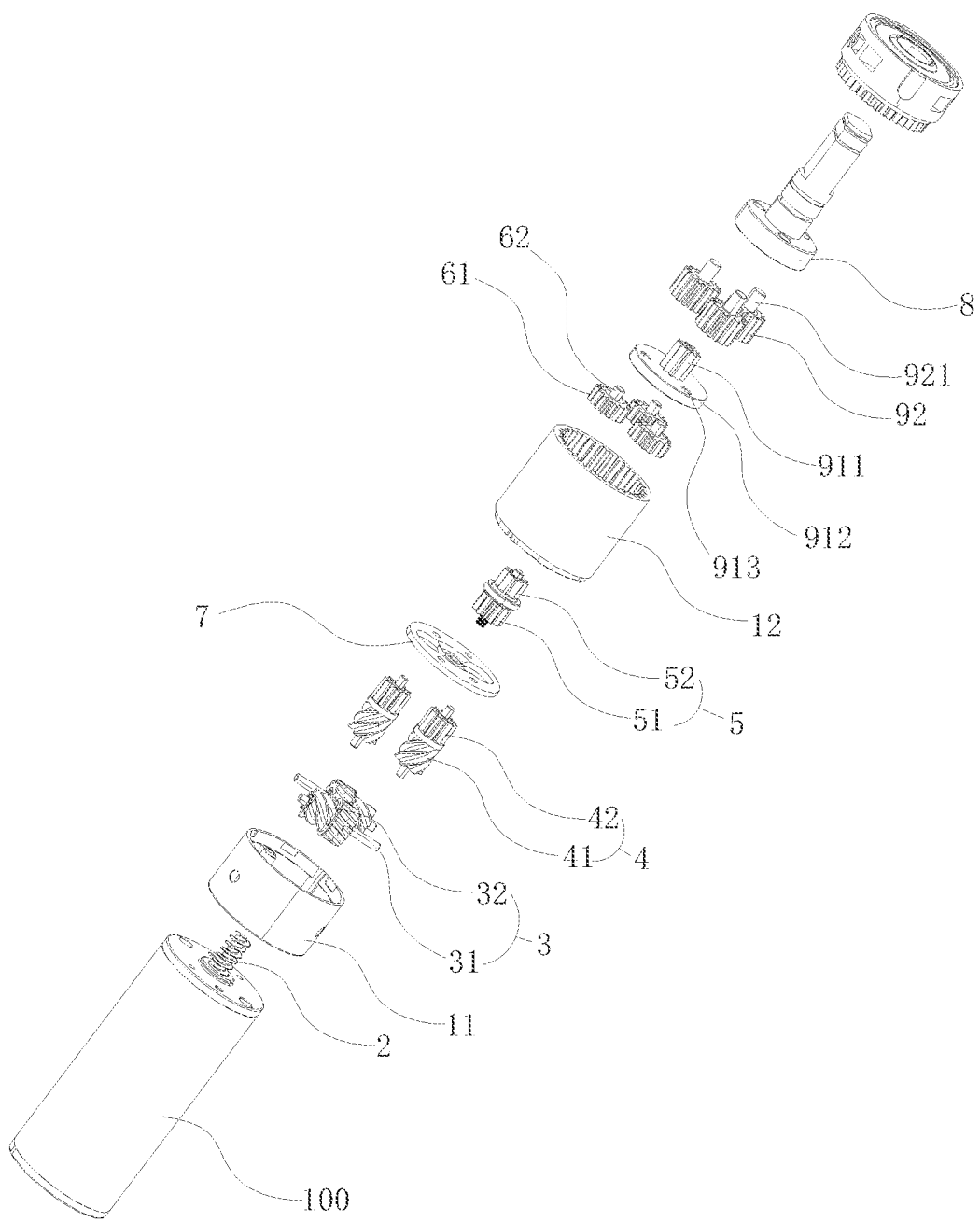
FIG. 9 is a structural diagram in an exploded view of the gearbox and the motor provided coaxially of embodiment 2 of the present disclosure.
Figure 10:
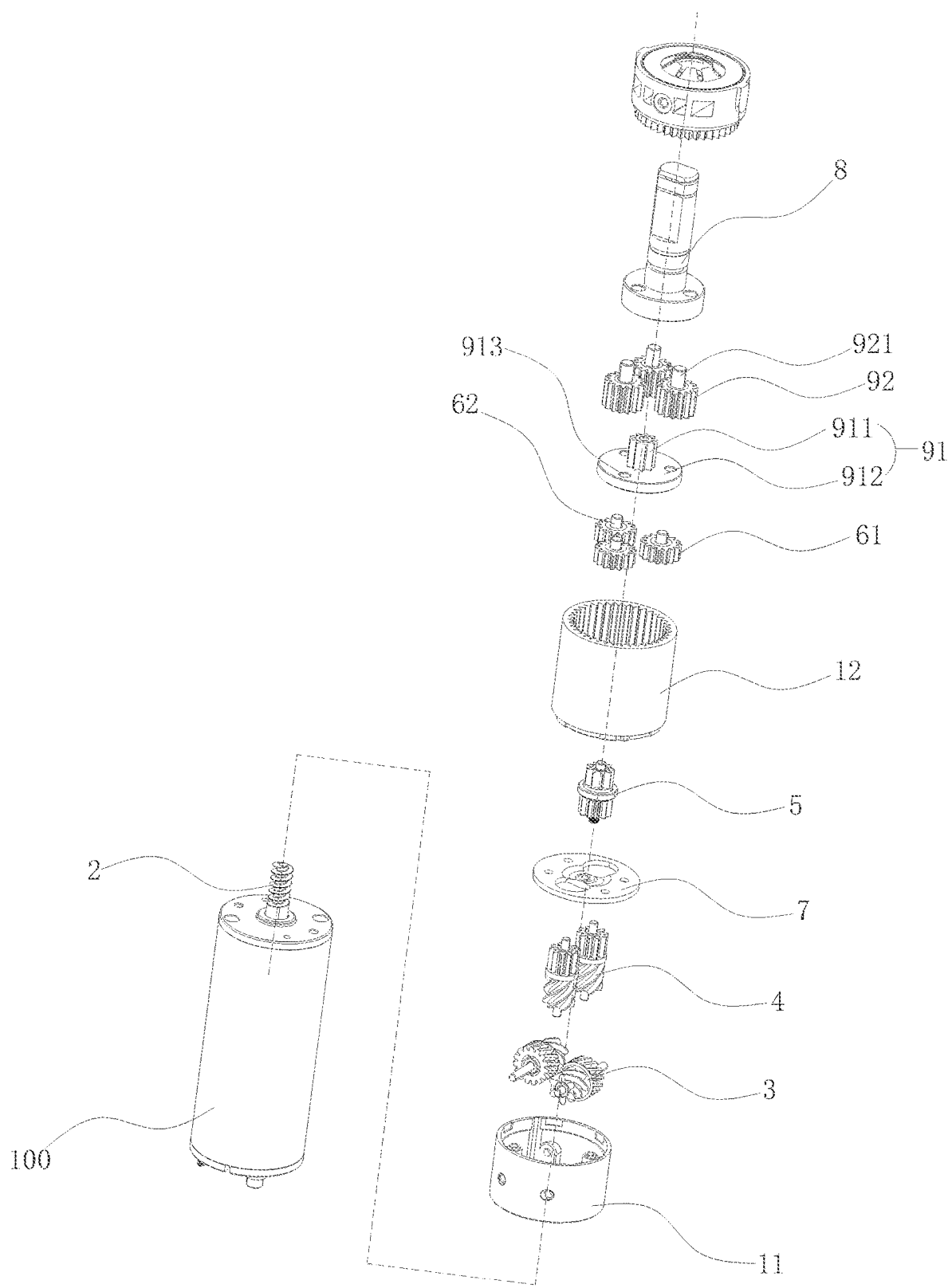
FIG. 10 is a structural diagram in another exploded view of the gearbox and the motor provided coaxially of embodiment 2 of the present disclosure.
Figure 11:
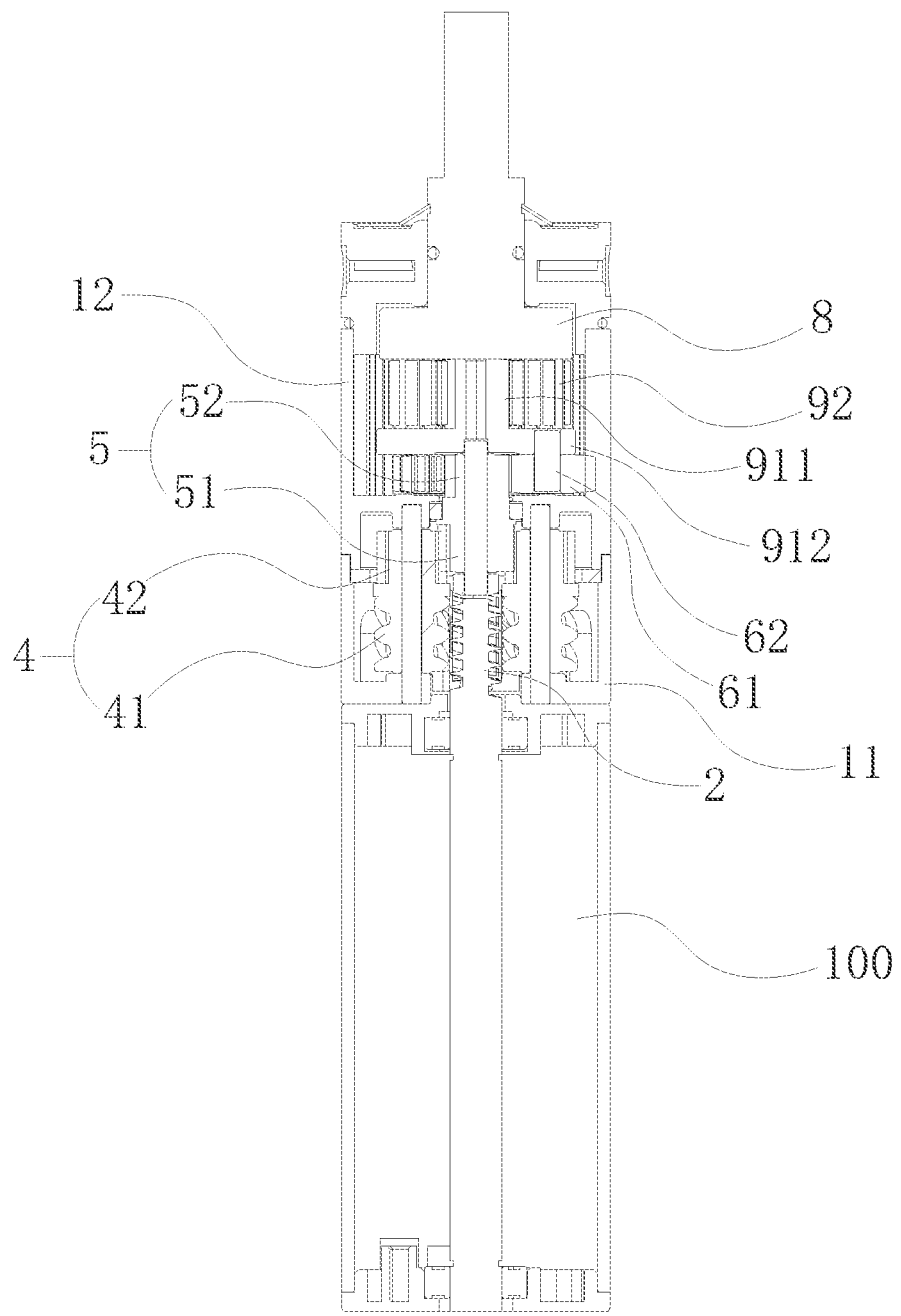
FIG. 11 is a structural diagram in a sectional view of the gearbox and the motor provided coaxially of embodiment 2 of the present disclosure.

In the present embodiment, referring to FIG. 7, three first-stage planetary gears 61 are provided evenly around a peripheral direction of the sixth gear segment 52. The three first-stage planetary gears 61 are required to be connected to three fourth rotating shafts 62, and all three fourth rotating shafts 62 are connected to the output planetary carrier 8, so that a high load sharing performance is achieved. When larger ratios as well as higher torques are required, more first-stage planetary gears 61 may be provided to meet the above requirements. Admittedly, the number of the first-stage planetary gears 61 may also be configured according to the design needs of the actual application scenario.

In some implementations, in order to improve the stability of the third gear 5, referring to FIG. 1 and FIG. 3, on the basis of the structure mentioned above, the chamber constituted by connecting the first housing 11 and the second housing 12 is provided with a structural plate 7 fixedly mounted therein, the structural plate 7 is provided with a fifth mounting hole 71 and a second avoidance hole 72, the fourth gear segment 42 passes through the second avoidance hole 72 to engage with the fifth gear segment 51, the first-stage planetary gear 61 is connected with a fourth rotating shaft 62, the fourth rotating shaft 62 is connected with an output planetary carrier 8, the output planetary carrier 8 is provided with a sixth mounting hole 81, and both ends of the third rotating shaft 54 are mounted in the fifth mounting hole 71 and the sixth mounting hole 81 respectively. In the present embodiment, the output planetary carrier 8 is the output shaft of the gearbox.

Specifically, referring to FIG. 1 and FIG. 3, the structural plate 7 is provided in the chamber constituted by connecting the first housing 11 and the second housing 12, and the edges of the structural plate 7 may be set to be abutted against an interior wall of the chamber mentioned above to ensure that the structural plate 7 does not shift laterally. The structural plate 7 is provided with a fifth mounting hole 71 and a second avoidance hole 72, the fourth gear segment 42 passes through the second avoidance hole 72 to engage with the fifth gear segment 51, a center of the first-stage planetary gear 61 is connected with a fourth rotating shaft 62, the fourth rotating shaft 62 is connected with an output planetary carrier 8, a center of a side of the output planetary carrier 8 facing the first-stage planetary gear 61 is provided with a sixth mounting hole 81, and both ends of the third rotating shaft 54 are mounted in the fifth mounting hole 71 and the sixth mounting hole 81 respectively. This ensures the stability of the third gear 5 during transmission to cope with the application scenario of high loads. The output is carried out through the fourth rotating shaft 62 of the first-stage planetary gear 61 of the first planetary transmission mechanism, which provides excellent load-sharing performance, and the number of the first-stage planetary gears 61 as well as the modulus of the entire first planetary transmission mechanism may be adjusted depending on the level of the output torque to meet the torque output under different torque requirements.

In order to further improve the stability of the third gear 5 during transmission, referring to FIG. 1 and FIG. 3, a columnar segment 53 is provided at a connection between the fifth gear segment 51 and the sixth gear segment 52 of the third gear 5, the first avoidance hole 123 is provided with a bearing 124, and the columnar segment 53 is abutted against an interior wall of the bearing 124.

Specifically, the columnar segment 53 of the third gear 5 is abutted against the interior wall of the bearing 124, and the exterior wall of the bearing 124 is abutted against the first avoidance hole 123, so as to distribute the load of the middle of the third gear 5 to the structural plate 7 through the bearing 124 during rotation of the third gear 5, so as to improve the stability of the third gear 5 during movement to cope with the working scenario of high loads. Also, the bearing 124 is assisted during the rotation of the third gear 5 to reduce friction.

In some implementations, in order to improve the load carrying capacity, power output and self-locking performance of the gearbox, referring to FIG. 1, there is a plurality of first gears 3 and correspondingly a plurality of first rotating shafts 33, all the first gears 3 and the first rotating shafts 33 are arranged evenly spaced apart in a peripheral direction of the worm shaft 2, the first housing 11 is provided with the first mounting holes 113 and the second mounting holes 114 at positions corresponding to both ends of each first rotating shaft 33, and both ends of each first rotating shaft 33 are fixedly mounted in correspondingly the first mounting hole 113 and the second mounting hole 114 respectively; and there is a plurality of second gears 4 and correspondingly a plurality of second rotating shafts 43, each second gear 4 is engaged with the corresponding first gear 3, the first housing 11 is provided with the third mounting holes 112 at positions corresponding to an end of each second rotating shaft 43, the second housing 12 is provided with the fourth mounting holes 122 at positions corresponding to an opposite end of each second rotating shaft 43, and both ends of each second rotating shaft 43 are fixedly mounted in correspondingly the third mounting hole 112 and the fourth mounting hole 122 respectively.

Since the first gears 3 are disposed evenly along a peripheral direction of the worm shaft 2, it is ensured that the plurality of first gears 3 provided are all engaged with the worm shaft 2. The distance between the centers of the first gear 3 and the second gear 4 may be adjusted with respect to the space limitation so that the axial direction of the third gear 5 is positioned on the extension line of the axial direction of the worm shaft 2.

During the rotation, the worm shaft 2 drives the plurality of first gears 3 evenly provided around it to rotate, the plurality of first gears 3 drive the correspondingly engaged plurality of second gears 4 to rotate, and the plurality of second gears 4 drive the plurality of first gears 3 to rotate. By increasing the number of the first gear 3 and the second gear 4 as mentioned above to bear the load evenly, the transmission efficiency may be kept above 60% at the transmission between the worm shaft 2 and the first gear 3, and above 70% at the transmission between the first gear 3 and the second gear 4, improving the stability of the gearbox and the self-locking performance, avoiding the occurrence of accidents caused by the loss of self-locking force due to gear fatigue resulting from disengagement from the motor power in the case of working at high frequency or high loads.

Figure 6:
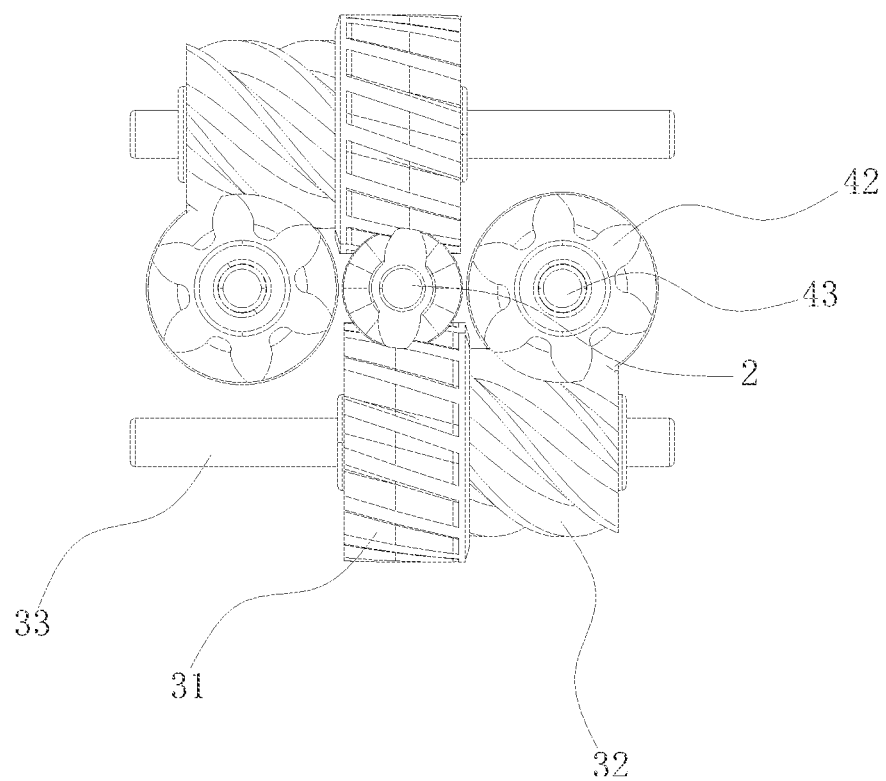
FIG. 6 is an engagement diagram of the worm shaft, the first gear, and the second gear of embodiment 1 of the present disclosure.

In the present embodiment, referring to FIG. 1 and FIG. 6, provided are two first gears 3, two first rotating shafts 33, two second gears 4, and two second rotating shafts 43. The two first gears 3 are symmetrically provided on both sides of the worm shaft 2 centered on the axial direction of the worm shaft 2, the two second gears 4 are symmetrically provided on both sides of the worm shaft 2 centered on the axial direction of the worm shaft 2, the two first gears 3 and the two second gears 4 are arranged in a cross shape, and the worm shaft 2 is positioned in a middle of the cross shape. The above setup satisfies most of the usage scenarios, and the production cost is easy to control, which provides better versatility.

In some implementations, in order to further improve the stability of the structural plate 7, referring to FIG. 3, a snap-fit structure is provided at a connection position between the first housing 11 and the second housing 12, the snap-fit structure enables snap-fit fixing of the structural plate 7, which also achieves the connection between the first housing 11 and the second housing 12, which further improves the integrality and stability of the gearbox, thereby reducing the occurrence of offsetting of the structural plate 7 due to excessive loading.

Specifically, referring to FIG. 3, an interior wall of the first housing 11 facing the second housing 12 is provided with an annular flange 115, a side of the second housing 12 facing the first housing 11 is provided with an annular protrusion 127 corresponding to the annular flange 115. For facilitating the assembly between the first housing 11 and the second housing 12, the annular flange 115 and the annular protrusion 127 may simultaneously provide a snap-fit limitation on an upper and a lower side of the edge of the structural plate 7, respectively, which provides a further limitation of the structural plate 7. The annular flange 115 and the annular protrusion 127 are provided on the first housing 11 and the second housing 12 respectively. When mounting the first housing 11 and the second housing 12, the structural plate 7 may be fixed, which facilitates mounting, and the annular flange 115 and the annular protrusion 127 provide better fixation to the structural plate 7 so as to improve the stability of the third gear 5, thereby improving the stability of the gearbox.

The working principle of the present disclosure is as follows.

The worm shaft 2 serves as the power output end, the worm shaft 2 drives two first gears 3 centrosymmetrically provided on both sides thereof, the two first gears 3 drive the second gears 4 engaged therewith respectively, the two second gears 4 drive the third gears 5 engaged therewith collectively, and the sixth gear segment 52 of the third gears 5 serving as the first-stage sun gears drives three first-stage planetary gears 61 provided evenly engaged therewith in a peripheral direction. The recess 125 is provided in the second housing 12, the second housing 12 and the first housing 11 serving as fixing members are fixedly connected to other components, which limits the rotation of the recess 125, i.e., the first-stage gear ring is stationary. Referring to FIG. 5, the three first-stage planetary gears 61 revolve around the first-stage sun gear (sixth gear segment 52) along the internal gear teeth 126 of the recess 125 engaged therein. The first-stage planetary gear 61 is mounted on the fourth rotating shaft 62 and is rotated with respect to the fourth rotating shaft 62. The output planetary carrier 8 connected to the fourth rotating shaft 62 may be rotated followed by the revolution of the fourth rotating shaft 62 driven by the first-stage planetary gear 61, so as to achieve a relatively high torque output. Then the output planetary carrier 8 is connected to a retractable rod or other retractable assembly to accomplish the mechanical retraction.

Additionally, the first gear 3, the second gear 4, the third gear 5 and the first-stage planetary transmission mechanism of the present disclosure may, according to the actual design requirements, be additionally provided with a reduction transmission mechanism between the worm shaft 2 and the first gear segment 31, between the fourth gear segment 42 and the fifth gear segment 51, and between the first-stage planetary transmission mechanism and the output shaft of the gearbox, so as to increase the output torque step by step to improve the overall gearbox stability.

Provided in the present disclosure is also a transmission system, including a gearbox mentioned above and a motor 100, in which the motor output shaft 101 is connected with a worm shaft. The output shaft of the gearbox is coaxially in transmission connection with the motor output shaft 101 and the worm shaft, which facilitates the mounting of the entire transmission system in a space or chamber with a limited cross-sectional area, such as the lifting table legs, lifting laundry drying racks, lifting chairs, small lifting booths, lifting parasols, lifting windows and other furniture requiring a lifting function, which may be applied in application scenarios requiring high output torque, which effectively solves the safety hazards present in the prior art.

The transmission system provided in the present disclosure is particularly applicable in lifting and lowering devices with requirements for high load capacity. Referring to FIG. 3 and FIG. 5, the worm shaft 2 is connected to the motor 100 coaxially provided therewith. The lifting and lowering function is achieved by connecting the output planetary carrier 8 of the gearbox to a retractable rod driven by rotation. Since the motor output shaft 101 of the motor 100, the worm shaft 2 and the output planetary carrier 8 are coaxially connected in the worm shaft transmission system, it facilitates the coaxial connection of the retractable rod, so as to achieve the coaxial connection of the motor 100, the worm shaft 2, the output planetary carrier 8 and the retractable rod, and finally to achieve that the motor 100, the worm shaft 2, the output planetary carrier 8 and the retractable rod may be integrated into the lifting device housing with limited cross-sectional area. The above-mentioned lifting device may be applied in lifting tables, lifting laundry drying racks, lifting chairs, small lifting booths, lifting parasols, lifting windows, and other furniture that requires lifting functions. As the lifting table may place many items and some of the desktop weight of the higher quality desk is also quite heavy, despite having to cope with the user's hands pressing on the table or even the user sitting on the table, the transmission power and load capacity of the lifting table is required to be extremely high, and most of the torque requirements for the output stage of the gearbox on the market are 4 NM-120 RPM, which is not possible to integrate the motor 100, the gearbox, and the retractable rod collectively in the table legs with limited cross-sectional area. Therefore, provided in the present invention is a worm shaft transmission system with a small space occupation, a good self-locking performance and a high transmission efficiency for practical applications, for installation in furniture requiring lifting and lowering functions. Due to the good self-locking performance of the present disclosure, the technical solution of the present disclosure may also be applied to products with self-locking requirements in case of power failure.

Embodiment 2

On the basis of the Embodiment 1, technical features not elaborated in the present embodiment may be explained by employing embodiment 1. In the present embodiment, referring to FIGS. 8-11, in order to allow the structure provided by the present disclosure to be more adapted to the roller blinds with curtains, the output torque of the gearbox to be greater, the output rotation speed to be smaller, the output force to be smoother, and the output accuracy to be higher, an additional set of second-stage planetary transmission mechanism is provided between the output planetary carrier 8 and the first-stage planetary transmission mechanism, in which the second-stage planetary transmission mechanism includes a second-stage sun gear planetary carrier 91 and a second-stage planetary gear 92, the second-stage sun gear planetary carrier 91 includes a second-stage sun gear 911 and an output rotating plate 912, and the second-stage sun gear 911 and the output rotating plate 912 may be integrally molded, or they may be connected by other fixed connections. The second housing 12 is provided with internal gear teeth 126 corresponding to the first-stage planetary gear 61, constituting a first-stage gear ring of the first-stage planetary transmission mechanism. The second housing 12 is also provided with engagement gear teeth corresponding to the second-stage planetary gear 92, constituting a second-stage gear ring of the second-stage planetary transmission mechanism. Provided is a plurality of second-stage planetary gears 92, the plurality of second-stage planetary gears 92 are all engaged with the second-stage gear ring provided in the second housing 12 correspondingly, and the second-stage sun gears 911 are engaged with all second-stage planetary gears 92 respectively. The output rotating plate 912 is provided with a through-hole 913 for inserting the fourth rotating shaft 62, the first-stage planetary transmission mechanism is connected to the output rotating plate 912 by means of the fourth rotating shaft 62 to drive the output rotating plate 912, and the second-stage sun gear 911 fixedly connected to the output rotating plate 912 to rotate, and the second-stage sun gear 911 drives the second-stage planetary gear 92 to revolve around the second-stage sun gear 911. Then, the fifth rotating shaft 921 of the second-stage planetary gear 92 drives the output planetary carrier 8 to rotate, the output planetary carrier 8 serving as the output shaft of the gearbox. An upper part of the second housing 12 is fixed with a cover of the gearbox, the output planetary carrier 8 is rotatably cooperated with the cover, and the shaft of the output planetary carrier 8 penetrating to an exterior of the cover may be in transmission connection with an external component and may drive the external component to move. By decelerating through the above two sets of first-stage planetary transmission mechanism, the output precision is improved, so as to be applied to the scenarios with high requirements on precision, such as being used as the rollers of automatic curtains or automatic roller curtains in such products, and also used in automatic lifting laundry drying racks, small automatic lifting booths, automatic lifting parasols, automatic lifting windows, and other furniture that requires lifting functions.

In the specific implementation scenario, the output planetary carrier 8 serving as the output shaft of the gearbox is connected to the roller of the curtains to drive the forward and reverse rotation of the roller, so as to drive the curtains to unfold and rewind, which accomplishes the automation of the curtains. Also, the two sets of planetary transmission mechanisms improve the precision of the output, running smoother, and improve the transmission balance.

Additionally, the second-stage planetary transmission mechanism may also be configured with the number of second-stage planetary gears 92 according to specific requirements, and the output torque may also be adjusted by adjusting the modulus of the gear teeth of the second-stage planetary transmission mechanism having the gear teeth members (the second-stage sun gears 911, the second-stage planetary gears 92, and the second-stage gear rings) in correspondence to cope with a greater variety of different usage scenarios.

It should be noted that those skilled in the art may also arrange more stages of the planetary transmission mechanism as required to cope with different application scenarios, such as a third-stage planetary transmission mechanism or a fourth-stage planetary transmission mechanism.

The technical means disclosed in the solution of the present disclosure are not limited to those disclosed in the embodiments mentioned above but also include technical solutions consisting of any combination of the above technical features. It should be noted that for those skilled in the art, a plurality of improvements and modifications may be made without departing from the principles of the present disclosure. These improvements and modifications are also considered to be within the scope of protection of the present disclosure.

The invention claimed is:

1. A gearbox, comprising:
   a box, provided with a hollow chamber;
   a worm shaft;
   a first gear, connected with a first rotating shaft, comprising a first gear segment and a second gear segment, rotated around an axial direction of the first rotating shaft;
   a second gear, connected with a second rotating shaft, rotated around an axial direction of the second rotating shaft; and
   an output shaft, in transmission connection with the second gear,
   wherein the worm shaft, the first gear, and the second gear are all provided in the chamber, the output shaft extends out of the chamber, the worm shaft is engaged perpendicular to the first gear segment so that the axial direction of the first rotating shaft is perpendicular to an axial direction of rotation of the worm shaft, the second gear segment is engaged perpendicular to the second gear so that the axial direction of the second rotating shaft is perpendicular to the axial direction of the first rotating shaft, and both ends of the first rotating shaft and both ends of the second rotating shaft are all mounted in the box;
   wherein the second gear comprises a third gear segment and a fourth gear segment, the third gear segment is engaged with the second gear segment, the fourth gear segment is engaged in parallel to a third gear, the third gear is connected with a third rotating shaft, the third gear is rotated around an axial direction of the third rotating shaft, the axial direction of the third rotating shaft is co-linear with the axial direction of the worm shaft, and the third gear is in transmission connection with the output shaft by means of a planetary transmission mechanism.

2. The gearbox according to claim 1, wherein the box comprises a first housing and a second housing, the first housing being connected to the second housing to form the chamber;
   the first housing is provided with a first mounting hole and a second mounting hole, both ends of the first rotating shaft being mounted in the first mounting hole and the second mounting hole respectively; and
   the first housing is provided with a third mounting hole, the second housing is provided with a fourth mounting hole, and both ends of the second rotating shaft are mounted in the third mounting hole and the fourth mounting hole respectively.

3. The gearbox according to claim 2, wherein there is a plurality of first gears and correspondingly a plurality of first rotating shafts, all the first gears and the first rotating shafts are arranged evenly spaced apart in a peripheral direction of the worm shaft, the first housing is provided with the first mounting holes and the second mounting holes at positions corresponding to both ends of each first rotating shaft, and both ends of each first rotating shaft are fixedly mounted in correspondingly the first mounting hole and the second mounting hole respectively;
   there is a plurality of second gears and correspondingly a plurality of second rotating shafts, each second gear is engaged with the corresponding first gear, the first housing is provided with the third mounting holes at positions corresponding to an end of each second rotating shaft, the second housing is provided with the fourth mounting holes at positions corresponding to an opposite end of each second rotating shaft, and both ends of each second rotating shaft are fixedly mounted in correspondingly the third mounting hole and the fourth mounting hole respectively.

4. The gearbox according to claim 2, wherein an interior wall of the first housing facing the second housing is provided with an annular flange, a side of the second housing facing the first housing is provided with an annular protrusion corresponding to the annular flange, and the annular flange is snap-fitted with the annular protrusion.

5. The gearbox according to claim 1, wherein the third gear comprises a fifth gear segment and a sixth gear segment, the fifth gear segment is engaged in parallel to the fourth gear segment, the box is provided with a first avoidance hole, the sixth gear segment passes through the first avoidance hole to connect a first-stage planetary transmission mechanism of the planetary transmission mechanism, the sixth gear segment serves as a first-stage sun gear of the first-stage planetary transmission mechanism, and an output end of the first-stage planetary transmission mechanism is in transmission connection with the output shaft.

6. The gearbox according to claim 5, wherein an end of the box proximal to the sixth gear segment is extended with a recess towards an axial direction of the sixth gear segment, an interior wall of the recess is provided with internal gear teeth constituting a first-stage gear ring of the first-stage planetary transmission mechanism, at least one first-stage planetary gear is provided between the sixth gear segment and the recess, all first-stage planetary gears are engaged with the sixth gear segment and the first-stage gear ring respectively, and the first-stage planetary gear is in transmission connection with the output shaft.

7. The gearbox according to claim 6, wherein the chamber is provided with a structural plate fixed on the box, the structural plate is provided with a fifth mounting hole and a second avoidance hole, the fourth gear segment passes through the second avoidance hole to engage with the fifth gear segment, the first-stage planetary gear is connected with a fourth rotating shaft, the fourth rotating shaft is connected with an output planetary carrier, the output planetary carrier is provided with a sixth mounting hole, both ends of the third rotating shaft are mounted in the fifth mounting hole and the sixth mounting hole respectively, a second-stage planetary transmission mechanism of the planetary transmission mechanism is provided between the output planetary carrier and the first-stage planetary transmission mechanism, and the output planetary carrier serves as the output shaft.

8. The gearbox according to claim 5, wherein a columnar segment is provided at a connection between the fifth gear segment and the sixth gear segment of the third gear, the first avoidance hole is provided with a bearing, and the columnar segment is abutted against an interior wall of the bearing.

9. A transmission system, comprising a motor and a gearbox, the gearbox comprising:
a box, provided with a hollow chamber;
a worm shaft;
a first gear, connected with a first rotating shaft, comprising a first gear segment and a second gear segment, rotated around an axial direction of the first rotating shaft;
a second gear, connected with a second rotating shaft, rotated around an axial direction of the second rotating shaft; and
an output shaft, in transmission connection with the second gear, wherein the worm shaft, the first gear, and the second gear are all provided in the chamber, the output shaft extends out of the chamber, the worm shaft is engaged perpendicular to the first gear segment so that the axial direction of the first rotating shaft is perpendicular to an axial direction of rotation of the worm shaft, the second gear segment is engaged perpendicular to the second gear so that the axial direction of the second rotating shaft is perpendicular to the axial direction of the first rotating shaft, and both ends of the first rotating shaft and both ends of the second rotating shaft are all mounted in the box;
a motor output shaft is coaxially in transmission connection with the worm shaft, and the output shaft of the gearbox is coaxially in transmission connection with the motor output shaft and the worm shaft.

10. The transmission system according to claim 9, wherein the box comprises a first housing and a second housing, the first housing being connected to the second housing to form the chamber;
the first housing is provided with a first mounting hole and a second mounting hole, both ends of the first rotating shaft being mounted in the first mounting hole and the second mounting hole respectively; and
the first housing is provided with a third mounting hole, the second housing is provided with a fourth mounting hole, and both ends of the second rotating shaft are mounted in the third mounting hole and the fourth mounting hole respectively.

11. The transmission system according to claim 10, wherein the second gear comprises a third gear segment and a fourth gear segment, the third gear segment is engaged with the second gear segment, the fourth gear segment is engaged in parallel to a third gear, the third gear is connected with a third rotating shaft, the third gear is rotated around an axial direction of the third rotating shaft, the axial direction of the third rotating shaft is co-linear with the axial direction of the worm shaft, and the third gear is in transmission connection with the output shaft by means of a planetary transmission mechanism.

12. The transmission system according to claim 11, wherein the third gear comprises a fifth gear segment and a sixth gear segment, the fifth gear segment is engaged in parallel to the fourth gear segment, the box is provided with a first avoidance hole, the sixth gear segment passes through the first avoidance hole to connect a first-stage planetary transmission mechanism of the planetary transmission mechanism, the sixth gear segment serves as a first-stage sun gear of the first-stage planetary transmission mechanism, and an output end of the first-stage planetary transmission mechanism is in transmission connection with the output shaft.

13. The transmission system according to claim 12, wherein an end of the box proximal to the sixth gear segment is extended with a recess towards an axial direction of the sixth gear segment, an interior wall of the recess is provided with internal gear teeth constituting a first-stage gear ring of the first-stage planetary transmission mechanism, at least one first-stage planetary gear is provided between the sixth gear segment and the recess, all first-stage planetary gears are engaged with the sixth gear segment and the first-stage gear ring respectively, and the first-stage planetary gear is in transmission connection with the output shaft.

14. The transmission system according to claim 13, wherein the chamber is provided with a structural plate fixed on the box, the structural plate is provided with a fifth mounting hole and a second avoidance hole, the fourth gear segment passes through the second avoidance hole to engage with the fifth gear segment, the first-stage planetary gear is connected with a fourth rotating shaft, the fourth rotating shaft is connected with an output planetary carrier, the output planetary carrier is provided with a sixth mounting hole, both ends of the third rotating shaft are mounted in the fifth mounting hole and the sixth mounting hole respectively, a second-stage planetary transmission mechanism of the planetary transmission mechanism is provided between the output planetary carrier and the first-stage planetary transmission mechanism, and the output planetary carrier serves as the output shaft.

15. The transmission system according to claim 12, wherein a columnar segment is provided at a connection between the fifth gear segment and the sixth gear segment of the third gear, the first avoidance hole is provided with a bearing, and the columnar segment is abutted against an interior wall of the bearing.

16. The transmission system according to claim 10, wherein there is a plurality of first gears and correspondingly a plurality of first rotating shafts, all the first gears and the first rotating shafts are arranged evenly spaced apart in a peripheral direction of the worm shaft, the first housing is provided with the first mounting holes and the second mounting holes at positions corresponding to both ends of each first rotating shaft, and both ends of each first rotating shaft are fixedly mounted in correspondingly the first mounting hole and the second mounting hole respectively;

there is a plurality of second gears and correspondingly a plurality of second rotating shafts, each second gear is engaged with the corresponding first gear, the first housing is provided with the third mounting holes at positions corresponding to an end of each second rotating shaft, the second housing is provided with the fourth mounting holes at positions corresponding to an opposite end of each second rotating shaft, and both ends of each second rotating shaft are fixedly mounted in correspondingly the third mounting hole and the fourth mounting hole respectively.

17. The transmission system according to claim 10, wherein an interior wall of the first housing facing the second housing is provided with an annular flange, a side of the second housing facing the first housing is provided with an annular protrusion corresponding to the annular flange, and the annular flange is snap-fitted with the annular protrusion.

* * * * *